US012233321B1

(12) United States Patent
Houser et al.

(10) Patent No.: US 12,233,321 B1
(45) Date of Patent: Feb. 25, 2025

(54) COLLAPSIBLE DEVICES FOR IMPROVING PLAYABILITY AND MARKETABILITY OF NET BASED SPORTS

(71) Applicants: Guy Menzie Houser, Port Angeles, WA (US); Joel Schneider Lippold, Port, WA (US); Christopher David Nelson, Sequim, WA (US); David Lynn Walter, Port Angeles, WA (US); Geoffrey Michael Wod, North Saanich (CA)

(72) Inventors: Guy Menzie Houser, Port Angeles, WA (US); Joel Schneider Lippold, Port, WA (US); Christopher David Nelson, Sequim, WA (US); David Lynn Walter, Port Angeles, WA (US); Geoffrey Michael Wod, North Saanich (CA)

( * ) Notice: Subject to any disclaimer, the term of this patent is extended or adjusted under 35 U.S.C. 154(b) by 0 days.

(21) Appl. No.: 16/024,644

(22) Filed: Jun. 29, 2018

(51) Int. Cl.
*A63B 61/02* (2006.01)
*G09F 7/18* (2006.01)
*G09F 23/14* (2006.01)

(52) U.S. Cl.
CPC ................ *A63B 61/02* (2013.01); *G09F 7/18* (2013.01); *G09F 23/14* (2013.01); *A63B 2209/02* (2013.01); *A63B 2210/50* (2013.01); *A63B 2225/093* (2013.01); *G09F 2007/1856* (2013.01)

(58) Field of Classification Search
CPC .......... A63B 2210/50; A63B 2225/093; A63B 61/02; A63B 61/00; A63B 61/003; A63B 61/006; A63B 61/04; A63B 2063/005; A63B 2063/006; A63B 2210/52;
(Continued)

(56) References Cited

U.S. PATENT DOCUMENTS 1,632,553 A * 6/1927 Lane ...................... A63B 61/02
473/493
3,966,205 A * 6/1976 Schain .................. A63B 63/00
473/462

(Continued)

OTHER PUBLICATIONS

Translation of Document WO-2005002683-A1, titled "Portable Net Post Frame for Shuttlecocks", by Inventor Wu Weixiong, original document included and published Jan. 13, 2005. (Year: 2005).*

(Continued)

*Primary Examiner* — Sebastiano Passaniti
(74) *Attorney, Agent, or Firm* — Emerson Thomson Bennett; Daniel A. Thomson

(57) ABSTRACT

A portable net system for net games is disclosed which provides for rapid assembly, lightweight construction, durability against damage while assembling and playing, and also provides enhancements inherent in the design which allow for improved marketing and advertising during tournaments. The net functions through having a bow-shaped tensioning rod reacting against the net top-tape to provide primary shape, net tension and height control. A vertical post at each distal end is attached to the foldable feet to provide lateral stability, and these are attached to the net via insertion into the net end-band and durably connected via the rigid bow end-connectors. Removable end-panels at each end net termination provides for a self-tensioned surface where advertising and sponsor labels may be attached.

13 Claims, 5 Drawing Sheets

(58) Field of Classification Search
CPC .... G09F 7/18; G09F 23/14; G09F 2007/1856; E04H 17/266
USPC ......... 473/490–496, 407, 478; 273/194, 197, 273/400; 160/24
See application file for complete search history.

(56) References Cited

U.S. PATENT DOCUMENTS

| | | | | |
|---|---|---|---|---|
| 4,010,951 | A * | 3/1977 | Gronlund | A63B 61/02 473/492 |
| 4,135,716 | A * | 1/1979 | Ginsburg | A63B 61/04 473/416 |
| 4,274,632 | A * | 6/1981 | Jacobs | A63B 61/02 473/492 |
| 4,844,455 | A * | 7/1989 | Funkhouser, Jr. | A63B 61/02 473/493 |
| 4,895,366 | A * | 1/1990 | Bartasius | A63B 61/003 473/492 |
| 4,979,754 | A * | 12/1990 | Eisenhart | A63B 67/002 473/474 |
| 5,018,746 | A * | 5/1991 | Cardoza, Jr. | A63B 67/002 473/474 |
| 5,269,527 | A | 12/1993 | Noval | |
| 5,320,344 | A * | 6/1994 | Henderson | A63B 61/04 473/494 |
| 5,562,288 | A * | 10/1996 | Erkebaev | A63B 69/0097 273/400 |
| 5,690,339 | A * | 11/1997 | Chen | A63B 63/004 273/400 |
| 5,816,956 | A | 10/1998 | Ellis | |
| 5,833,234 | A * | 11/1998 | Vavala | A63B 69/0097 273/400 |
| 5,865,691 | A | 2/1999 | Chen | |
| 6,210,288 | B1 | 4/2001 | Kim | |
| 6,461,258 | B1 * | 10/2002 | Vacanti | A63B 61/003 473/494 |
| 6,511,390 | B2 * | 1/2003 | Kim | A63B 63/00 473/439 |
| 6,868,619 | B1 * | 3/2005 | Boren | A63B 61/04 473/495 |
| 7,407,452 | B1 * | 8/2008 | Gawthrop | A63B 63/003 473/422 |
| 8,216,093 | B2 | 7/2012 | Chen | |
| 8,246,496 | B2 * | 8/2012 | Holland | A63B 63/004 273/400 |
| 8,968,122 | B1 | 3/2015 | DeMarco | |
| 9,283,455 | B2 * | 3/2016 | Nelson | A63B 61/00 |
| 9,545,551 | B1 | 1/2017 | Dinhoffer | |
| 9,795,849 | B2 * | 10/2017 | Nelson | A63B 69/00 |
| 9,795,857 | B2 | 10/2017 | Nelson | |
| 9,950,235 | B1 | 4/2018 | Williams | |
| 2005/0227794 | A1 * | 10/2005 | Bouffard | A63B 69/0097 473/478 |
| 2011/0230284 | A1 * | 9/2011 | Simon | A63B 61/02 248/188.7 |
| 2016/0001151 | A1 * | 1/2016 | Harvey | A63B 67/04 473/493 |
| 2018/0099192 | A1 * | 4/2018 | Crosby | A63B 61/04 |
| 2019/0046856 | A1 * | 2/2019 | Nelson | A63B 71/022 |
| 2023/0166168 | A1 * | 6/2023 | Zhou | A63B 61/003 473/492 |

OTHER PUBLICATIONS

Translation of Document FR-3077500-A1, titled "Boundary establishing system for sharing playing courts . . . ", by Inventor Cullier A et al, original document included and published Aug. 9, 2019. (Year: 2019).*

Translation of Document EP-2687272-A1, titled "Sports equipment intended for being deployed on teh ground . . . ", by Inventor Triboult Joel et al, original document included and published Jan. 22, 2014. (Year: 2014).*

Translation of Document FR-2847824-A1, titled "Net for ball game has rectangulart net with tensioner rod held in opposed . . . ", by Inventor Spittler Stephane et al, original document included and published Jun. 4, 2004. (Year: 2004).*

* cited by examiner

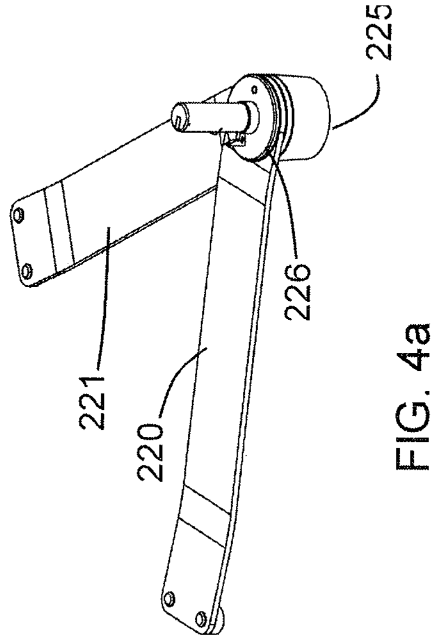
FIG. 4a
FIG. 4b
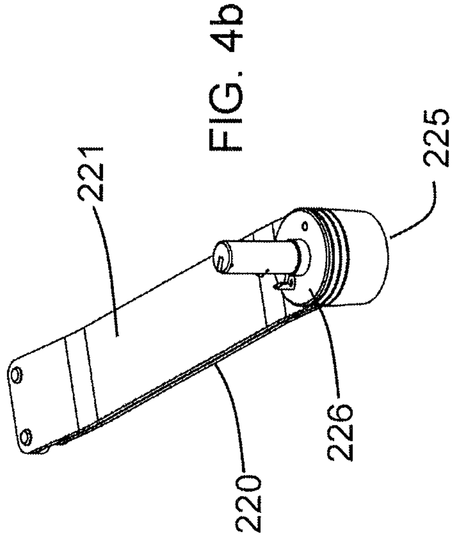
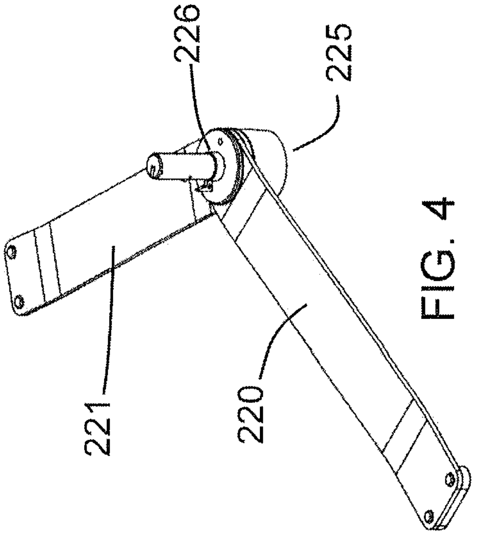
FIG. 4

COLLAPSIBLE DEVICES FOR IMPROVING PLAYABILITY AND MARKETABILITY OF NET BASED SPORTS

CROSS-REFERENCE TO RELATED APPLICATIONS

This application claims the benefit of U.S. Provisional Application 62/527,650 filed Jun. 30, 2017 and titled: Collapsible Devices for Improving Playability and Marketability of Net Sports.

BACKGROUND OF THE INVENTION

Pickleball is a rapidly growing indoor/outdoor sport played at a slower pace and with significantly less physical demands than badminton or tennis, leading towards a demographic weighted towards seniors and an elderly playing population. The playing area is closer in size to badminton than tennis, and often 3-4 Pickleball courts can be placed in the space previously occupied by 2 tennis courts. The age demographic is such that having solutions that minimize weight of all components and hardware and also provide improved accessibility and ease of assembly are highly desirable. Many courts dedicated previously to tennis in various senior/elderly communities are being converted to Pickleball, and given the broad infrastructure that exists of paved areas in these communities, a portable net/court system is highly desirable. For players, having a portable net system that is lightweight is desirable for transport to and from the playing area. The current state-of-the-art can be identified as portable, collapsible nets that weigh approximately 15 to 20 kilograms and are very difficult for elderly people to load and remove from a vehicle trunk. Similarly, carrying the 15-20 kg net system in a single carry bag to temporarily use and then walk it back to a central location poses an issue for people with limited load carrying capabilities. Players have identified that it is also desirable to have an improved functionality for the net structural/physical performance as well as methods for faster erection and take-down.

Portable nets for sports are well known and understood in several sports, and specifically in pickleball. Due to the nature of the playing surface, nets are very commonly erected and disassembled for playing on surfaces including basketball courts, tennis courts, parking lots, and the like. The current state-of-the-art in portable net systems consists of a lower cross-frame (in practice fabricated of tubular metal sections with swaged ends acting as receptacles for the proximal sections), with such cross-members attached to the base of a vertical post at each distal end. The vertical post and cross-member assembly is then attached to a system of legs or feet, which may or may not include rolling supports. The net tension is reacted through the vertical posts and across the base cross-member tensioners. It is generally necessary in these systems to provide a vertical support post at the net center to set the correct playing heights of nets, which are usually a specification of the sporting body. Such systems can be found in the patent literature and generally have exhibited several important disadvantages when reduced to practice.

The first key disadvantage is the reality of a practical system of swaged-end tubes that fit into other tube receptacles for provision of the cross-members (sometimes called male-female fitted tubes. These tubes are typical rectangular or ovalized in cross-section to accommodate torsional forces through the nodes, and when one edge of the metal gets damaged, even slightly, the assembly is very difficult if not impossible to repair. This is reported to be the source of many warrantee claims or nets are discarded due to this damage, as well as the most common rejection of nets due to shipment damage in transport from manufacturers. This damage can readily occur if the players step on the net lower cross member whilst playing, and also occurs regularly as reported when players drop the net carrying case or drop individual pieces during assembly. The second key disadvantage is the net weight. For practical purposes the system is typically made of mild steel and the overall weight when packaged is a significant burden for an elderly player to handle. Although the cross and vertical members could be made from lightweight metals or reinforced plastic composites, the forming and durability of the interlocking sections is further compromised with these materials as is evident to persons working in the field, thus leading to minimal weight benefit. The third disadvantage is that the net ends are tensioned by sliding over the vertical posts, which typically cantilever upwards off the base connection points. Thus net tension is difficult to manage and the top tape does not exhibit constant tension which is a desirable feature of play, especially at the higher levels. The current invention resolves these drawbacks of the known portable net inventions and products, and provides additional benefits and features that will become apparent on the description of the system.

Inventions have been proposed to attempt to overcome these issues, for example in Dinoffer, U.S. Pat. No. 9,545,551, adding non-sagging features, vertical support posts, and the like, however these do not inherently address weight, durability, and net tension problems adequately. It is also evident from recently patented devices that the state-of-the-art is still a baseline-supported approach or a pinned-post approach, both of which have substantial shortcomings within the industry.

SUMMARY

A net system, usable and developed primarily for Pickleball (but applicable to many other sports requiring separation of participants whether by rule or otherwise as is evident to those practiced and experienced in the field) has been developed and reduced to practice that combines several common approaches into a novel system that has not been previously conceived. Improved functionality has been demonstrated in the following areas: 1) Set-up and tear-down (in under 3 minutes vs. 15 minutes typical for state of the art nets); 2) Weighs under 7 kg but does not move or tip over in heavy wind with options for hold-downs to various playing surfaces; 3) Does not shift excessively when hit by ball; 4) Has well defined, repeatable and settable net tape heights as required by playing rules; 5) Meets all regulations for play; 6) Net supported only at ends, not at center; 7) Ball can roll beneath the net; 8) System will stand alone without tie-downs; 9) Does not damage common playing surfaces such as asphalt or wood surfaces; 10) Minimizes obstacles to around-the-post shots; 11) Can be used or left outdoors in rain without damage; 12) Is easily picked up at the center of the net and moved around the court or as required by just one individual due to the combination of light weight and stiff durable connections from net top to bow base at the center-point; and, 13) Is durable and withstands players falling on net with no damage occurring to bow or connections.

The present invention addresses issues with former approaches to portable nets for sports and other applications in that the net is developed as a component of a tensionstrung bow, with the net tape (top member) acting as the bow-string, and the bow itself made up of individual carbon, glass fiber, or other composite members that span the lower portion of the net as shown in FIG. 1. The stiffness (thus flexion) of the bow is designed by selection of the bow materials and the tube dimensions, and can be variable stiffness as required to keep the net parameters in the ideal design space. The bow structural pieces can be fabricated from round tube but also from other tubular (square, oval, etc.) or even open structural sections (I-beam, c-channel, etc.). It is preferred to fabricate the tube sections from round tube for ease of manufacturing, ease of assembly, and improved damage tolerance. A short section of ferrule is provided to durably nest the adjoining tubes to each other. In this design, if the user steps on the bow, the whole system flexes as one, and hence there is limited point loading on any one joint/ferrule, and thus very small likelihood of damage. Individual lengths of the bow are such that the breakdown of components fits easily in a typical small vehicle for transport, and this determines the number and type of intermediate ferrule connectors used in conjunction with the main bow pieces. In the first reduction to practice, eight individual bow members were used to make up the twenty-two foot nominal width of the finished net.

The bow end-sections fit at either end into universal cup-devices located distally at the top of the left and right end stanchions called the tensioner heads, and these are free to rotate in the plane of the net and slightly out-of-plane of the net to ensure lateral and longitudinal loads are appropriately reacted with no opportunity for damage due to impact when net is in play. A line passing through and fastened to the net top tape goes through the tensioner head and a cam-lock internal to the tensioner head acts as a method for allowing the players to pull the "bowstring" to a required tension for setting net height and then locking it with said cam mechanism. The interaction of net tape tension, bow compliance, and leg reinforcement sets the net height accurately and repeatedly, thus removing the need for a net center post or other means of highly tensioning the net. In tennis, the use of net top tension with a center tie-down restraint is their preferred method of adjusting the net height off the playing surface, requiring in turn that the posts react to quite high loads and be firmly anchored on (typically) thick steel posts set in concrete in the ground. Other portable nets in the market react their loads in metal supports nearer the base of the net and thus encounter cantilever loading flexing the net top and removing good net height control as well as contributing to easily tipping over, a common yet highly undesirable factor in current portable net play.

A set of folding base feet are provided with a pin receiver to accept the end-posts. This approach within the invention enables a very stable net platform against tipping or wind loads, provides a methodology for attaching custom made "feet" that are designed for different types of playing surfaces (wood, asphalt, concrete, plastic, etc.), ensures self-locating and extremely easy and fast set-up, and is adjustable for foot-region surface height variability or obstacle clearance. Foot design is such that the playing area is not encroached upon yet complete functionality is retained. A support bracket is provided at the mid-point of the net/bow, designed such that when the net is tensioned correctly, the support bracket is touching the ground and the net is then at the correct height. In this embodiment a single foot is placed at the center of the bow nearest the ground but can be anywhere along the bow and could be multiple feet as is evident to an experienced practitioner. As noted a cam mechanism is used in the tensioner head to adjust final tension and position of the components, however this could also be a threaded tensioner, a friction-lock device or any other similar functioning device that allows for the user to adjust tension based on net flexibility and bow flex. The tension adjustment thus ensures any future adjustment that becomes necessary due to net relaxation from aging can be compensated for in the design.

As is evident to one practiced in the art, there are several methods to accomplishing the above goals within the confines of this invention, and this description is not intended to be all-encompassing of the breadth of the invention.

BRIEF DESCRIPTION OF THE DRAWINGS

The above and other features, advancements, and advantages of the present inventions will be more clearly seen and noted in the description of the drawings and in the detailed description of the preferred embodiments as reduced to practice and explained following the drawings.

FIG. 4 is an isometric view of the base feet and riser support mechanism. FIGS. 4*a* and 4*b* are demonstrations of the closing and nesting mechanisms for the feet.

DESCRIPTION OF THE PREFERRED EMBODIMENTS

Figure 1:
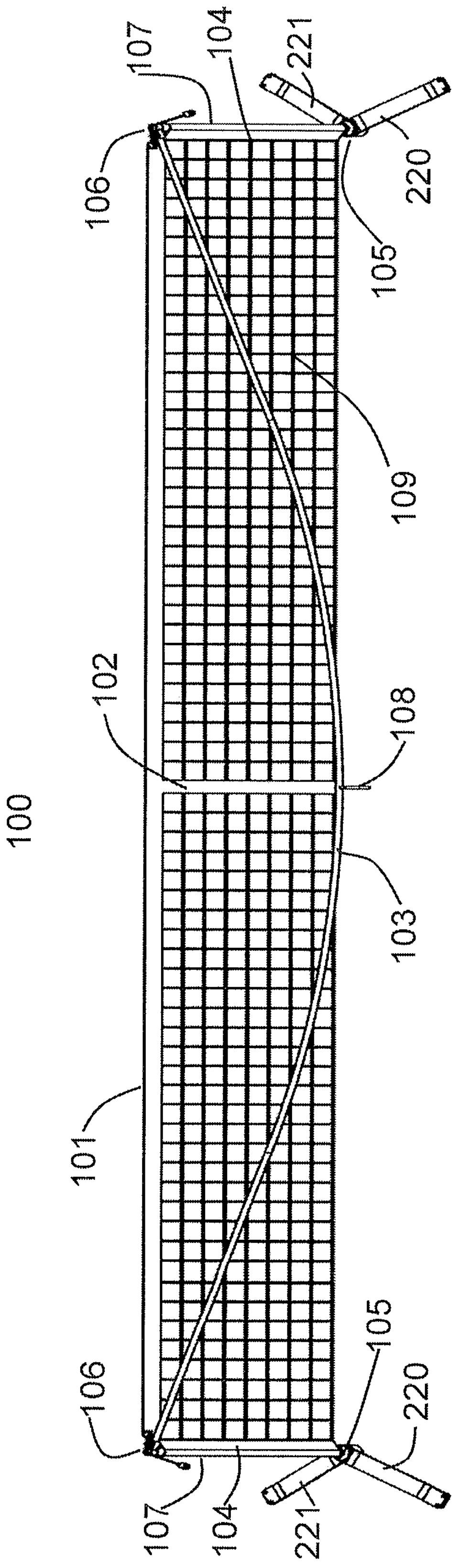
FIG. 1 is a view of the overall assembled net showing the global features as notably distinct from existing practice in net design.

FIG. 1 is a perspective view of the overall assembled net system shown as unit 100. The net assembly works based on the interaction of the tension developed in net top tape 101 that develops compression in the carbon fiber composite bow assembly 103. Loads are reacted in the distally located net top tensioners 106 that have an angled cup device into which bow end sections 103 are inserted, and a cam-lock device in 106 which serves to lock in the tension pulled on the net top tape 101. The actual net itself 109 is in fact hanging freely from the top tape 101. As a freely swinging net would not allow for a playable device, the net sleeve 104 is placed over the vertical stanchion 107 to create the required net restraint. The low tension imparted by the sleeve 104 over the stanchion 107 allows for a simple net end that can then enable easily replaceable advertising covers 104 to be used with a connection as simple as Velcro™ or similar functioning material. A foot device 108 is located such that when the correct tension is drawn in the top tape 101, it creates flex in the bow assembly 103 such that the vertically offset distance from ground to top of top tape 101, which includes the net, the foot, and the tape itself, exactly equals the required regulated playing height of the net system as governed by association rules of the particular sport. The vertical tape 102 serves as a limit for the net height, and also imparts a degree of tension in the net 109. The mid-foot 108 has a snap fit over the bow assembly 103 for ease of assembly and use. The end-stanchions 107 fit over a pinned projection on the feet assemblies 105 and the two foldable feet 220 and 221 then provide the final points of ground support for the overall net system 100.

Figure 2A:
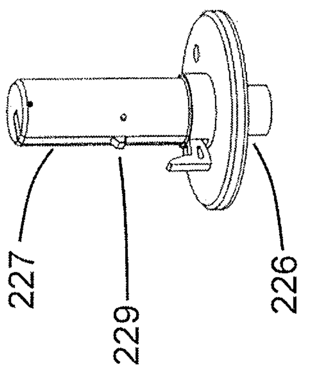
FIG. 2*a* is an isometric view of the feet-base to upright stanchion connector.
Figure 2:
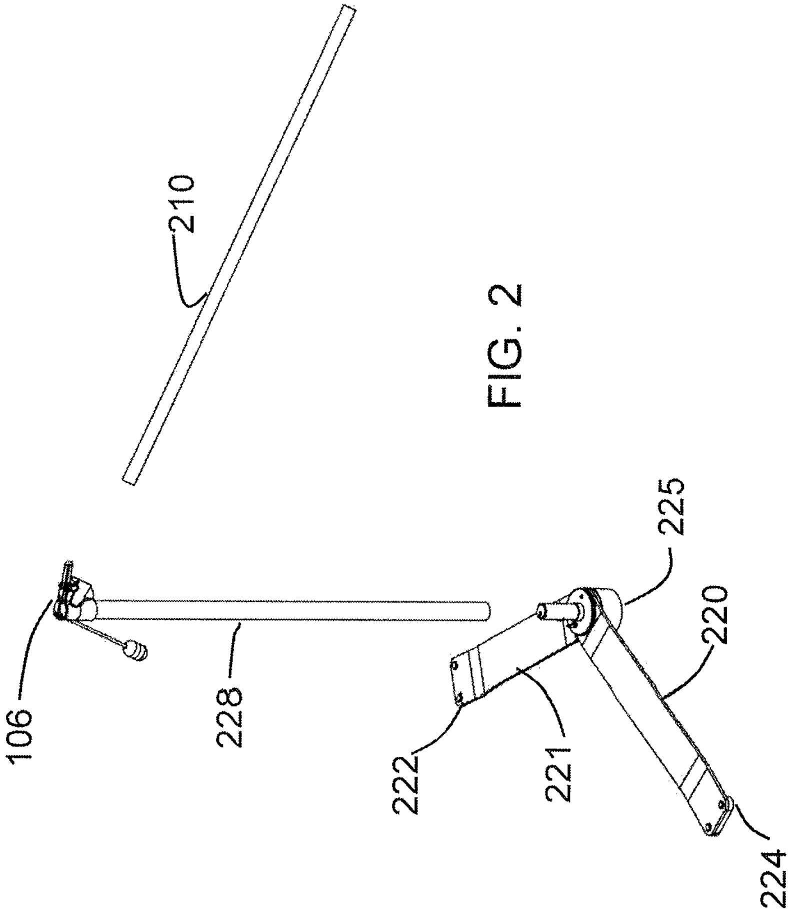
FIG. 2 is an exploded view of the distal end mounts for the net, showing the feet, riser post, top-tensioner, and first bow section.

FIG. 2 is an expanded perspective of the common left and right side distally located side-post assemblies. These are described starting from their base and working upwards in this embodiment. Two feet, 220 and 221 are provided for each side-post assembly which are splayed outward from the net assembly at approximately 120 degrees to each other, however any number of feet and any angle that provides appropriate support for the net could just as easily have been provided. In this embodiment the feet are foldable and nest over the top of each other as demonstrated in FIG. 4*a* and FIG. 4*b*. This feature is desirable for packaging and transport of the net system, however methodology of creating, arranging, and use of the feet could be created in several ways for someone practicing in the field. Feet 220 and 221 have attached at their ends pads 222 and 224 and the center pivoting support base has a rubber pad 225 which together act to provide a level and stable, non-marring support base for each side post assembly, said pads all of which are changeable for height adjustment on different surfaces, as well as useful to remove said pads 222, 224, and 225 and replace with other feet forms for using a portable net system in other sports and on other playing surfaces such as snow, sand, etc. It is also a desire of the invention that the said pads and feet support systems can be provided such that they interface with a relatively heavy base for use in high-wind locations or for more permanent installation, understanding that multiple methods of erecting on the playing surface are feasible as one versed in the development and usage of these devices will readily recognize. It is further a desire of the invention that the feet and base are not a required component to enable the invention to work, and the end-post stanchions 228 can readily be used for insertion into any sort of receptacle, permanent or otherwise, that enables the appropriate net dimensions to be established and used, however that the feet and related systems do provide a highly valued benefit in the usage for portable playing requirements.

Stanchions 228 are provided such that they may be extendable by any number of approaches akin to telescoping poles, and thereby create an additional degree of freedom in setting up for various playing surfaces and various sports. Telescoping poles are well known in the literature and include nesting shafts and any of a number of lock mechanisms as seen in the tripod mount industry, the adjustable kayak and stand-up paddle industry, and others.

In FIG. 2 it is further shown that the base assembly FIG. 2*a* around which the feet 220 and 221 are deployed is provided with a post 227 mounted to the base plate 226 such that the vertical stanchion 228 slides down over this post and locks in place with snap-pin 229. Although many versions of this assembly are feasible and evident to one practiced in the art, this preferred embodiment enables the snap-pin to also locate the alignment of the stanchion post 228 with the net 109 and thus ensure alignment of the net top tensioner 106 with the bow assembly 103, specifically where the most distally located bow assembly tube 210 interfaces with top tensioner 106. Alignment markings and stops are incorporated into the base cup 226 to provide the user with clear and repeatable guidelines during net assembly.

Figure 3:
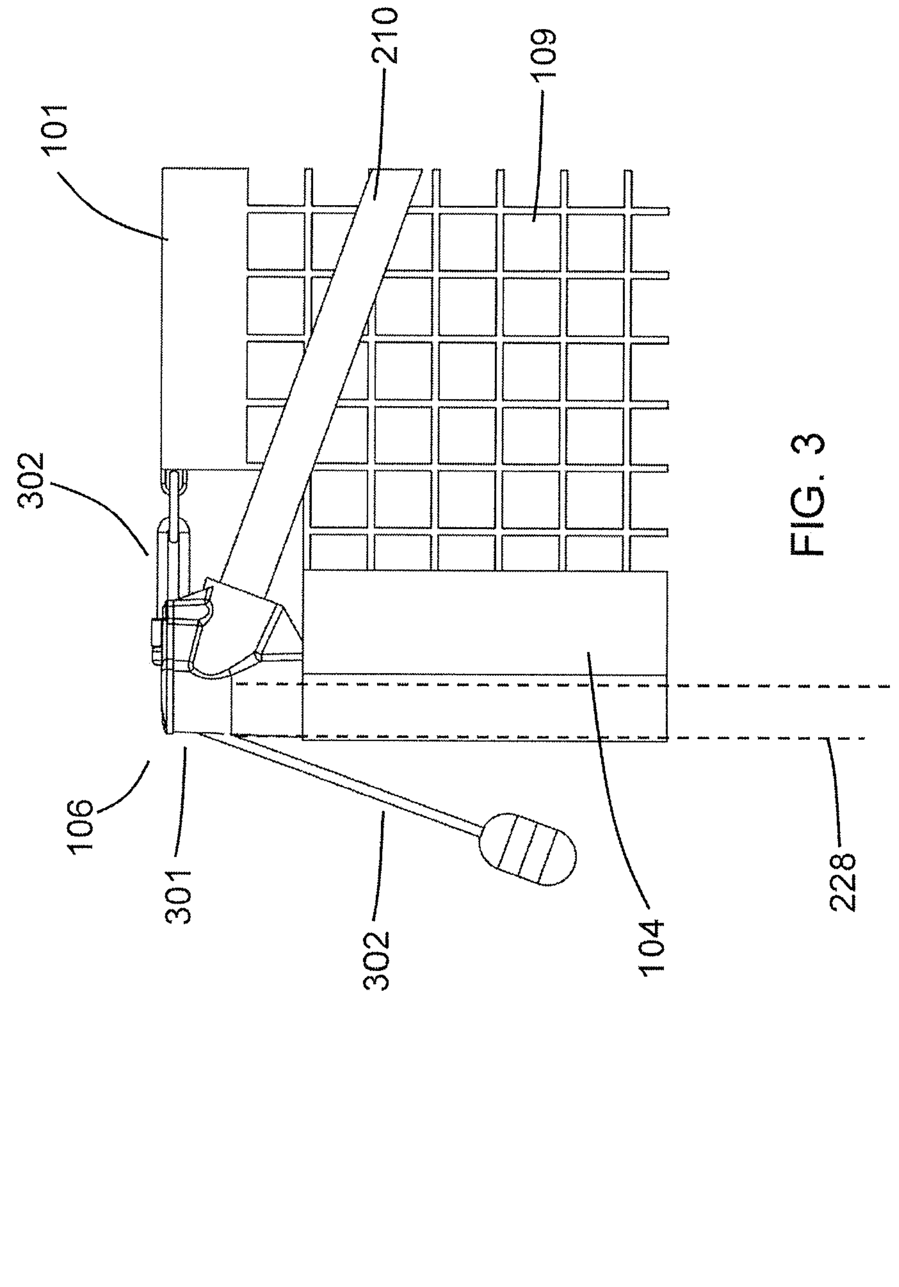
FIG. 3 is a close-up view of the top-tensioner and demonstrating the net strap and post-to-bow attachment details

FIG. 3 is an expanded view of the top of the end-post assembly and includes the top tensioner 106 system. The top tensioner component 301 is mounted on top of the end post stanchion 228, and has the distal end of the outermost bow tube 210 terminating in a pocket in the part 301. A draw-cord 302 is provided that acts to pull tension into the net top tape 101, and when correctly adjusted will then lock down into a cam-lock mechanism internal to the top tensioner 301. The net 109 wraps around the vertical stanchion 228 in this embodiment, but can be attached in any of a number of ways evident one versed in the art, including hanging freely, with use of individual ties or straps, and weaving through loops of the net being some of the many options. Importantly, this end panel 104 can be independent of the net system, thus can be utilized as an advertising platform, with simple replaceable end panels having differing advertising. Thus a tournament director or others can provide multiple end-panels, and change out these to reflect the players preference, the advertisers preference (such as selling different advertising for various stages of a tournament like quarter-finals, semi-finals, and finals) wherein the panels may be changed without any change of the overall net system or interruption in flow of play. The use of this advertising is not limited to printed media on soft end-wraps, and it is envisioned that advanced systems that include electronic advertising, remotely changeable advertising, and any of a number of different eye-catching options may be included. It is also envisioned that this system can serve as an electronic score board, visible to all players and spectators in real-time, and in one of the best locations to allow for players to keep their focus within the field of play. The approach envisioned allows for usage in systems whereby players or their playing devices (ball, racquet, etc.) impacting the net become important factors in the course of play, in which situation the end panel electronics can be interfaced with sensors in the net to monitor and record these events. End panel 104 having the ability to be removed and stored separately and in a more protected environment, allows for these electronics and their functions to be protected from damage in routine handling. The invention provides for any number of electronic functions to be captured and used through this end-panel arrangement.

FIGS. 4, 4*a*, and 4*b* demonstrate the method and design used for the folding lower feet 220 and 221. These components are friction-fit between the lower pad 225 and the post support assembly 226. They are developed such that the legs nest into a neat package for ease of storage and transport. Although shown in this preferred embodiment as demonstrated, it is evident to one practiced in the art that any number of simple methodologies can accomplish the same functional performance. A secondary but important purpose of the lower pad 225 is to provide a tripod base such that the system is freestanding when 220, 221, and 225 are expanded, thus the end-posts assemblies remain vertical and stable during net assembly.

Figure 5:
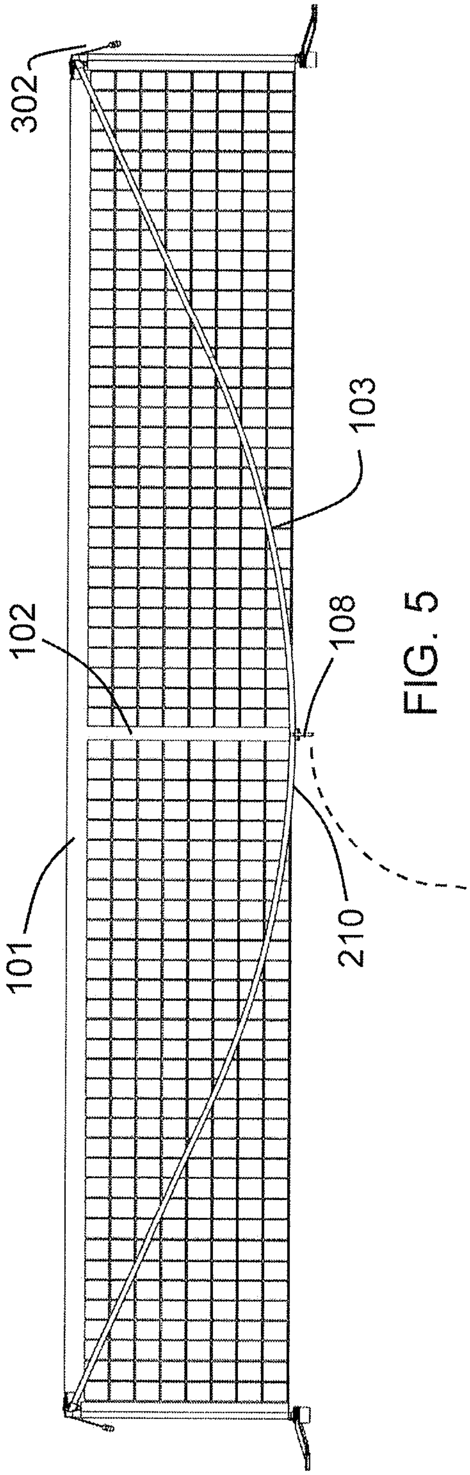
FIG. 5 is a side view of the net system showing how the end height and middle heights are set with the middle support foot touching the level playing surface.
Figure 5A:
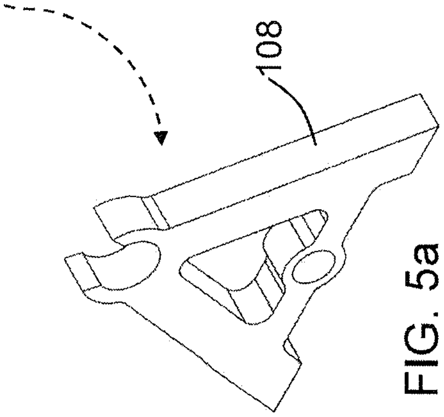
FIG. 5*a* is an isometric of the mid-foot component.

FIG. 5 demonstrates the methodology of net height adjustment at the center-point of the net, although this may be accomplished in several similar ways at any location(s) along the bow component 103. Mid-foot 108 is fitted onto mid-point proximal bow section 210 aligned with the vertical tape 102. The current method of attachment is via a snap-fit around the proximal bow section, however this foot 108 can be attached by any number of methods, including being a durable and/or integral part of the middle bow section. As the user pulls tension into the lines 302 thus tensioning net top tape 101, the bow assembly 103 gradually takes on the bow shape desired. At the correct height, the mid-point foot 108 will come into contact with the ground in a level playing surface. This method allow for precise setting of regulation net heights with no additional measurements or adjustments necessary, a highly desired feature as compared to current state-of-the-art offerings. The mid-foot 103 is supplied with integral foot pads to provide a degree of protection from scuffing and also to provide frictional resistance to lateral movement of the net center-point. The center strap 102 also serves as an adjustable net height setting device, such that as the net ages and net top tape or other components undergo stretching and dimensional changes due to weathering, etc., the length of the center strap can be set to accommodate the changes and still provide for accurate net height setting.

Figure 6:
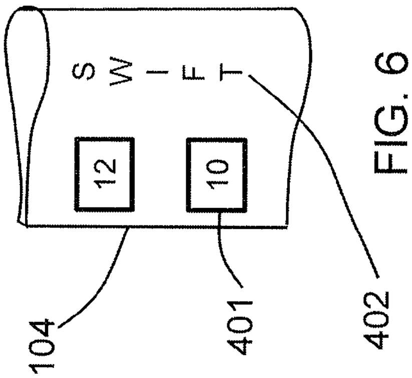
FIG. 6 is a view of the post end-wrap as used for various advertising displays and interchangeable without impacting the net tension and without evidently being a separate component.

FIG. 6 is a depiction of the end-wrap 104 which is showing the use of a sponsor's label 402 and an electronic scoring block 401. This end panel is wrapped around the post 228 and fastened back onto the net, and may or may not be a part of the net to post assembly.

Although the preferred embodiment of the present inventions have been described and disclosed for illustrative purposes, and reflect the net system developed and reduced to practice for specific use in a pickleball first application, those skilled in the art and practitioners in the industry and related industries will readily appreciate that various and sundry adaptations, variations, modifications, and approaches are possible without departing from the scope and intent of the invention. It is also evident that not every noted feature nor claim on the net invention is required for full functionality to be present and thus the invention can cover a broad spectrum of design options. It will also be evident to those in the industry that application of the net system is not limited to the field of sporting play, but could also find use in systems where a portable and easily erected net is desirable, such as in pens for livestock in county fairs and the like, enclosures for dogs in shows and training, fish pens, and many other applications with simple and easily conceivable additions that do not detract from the validity of the present inventions.

What is claimed is:

1. A portable net system comprising:

a net top tape having a first end and a second end at opposite sides of the net top tape;

a first net top tensioner, wherein the first net top tensioner is located at the first end of the net top tape;

a second net top tensioner, wherein the second net top tensioner is located at the second end of the net top tape, wherein the first net top tensioner and the second net top tensioner are manipulable to adjust tension on the net top tape;

a bow assembly having a first end section and a second end section at opposite sides of the bow assembly;

a first vertical stanchion;

a second vertical stanchion; and a net, wherein the net is attached to the first and the second vertical stanchions at opposite ends of the net, wherein the net is attached horizontally to the net top tape, wherein the net has a top and a bottom, wherein the first end section and the second end section of the bow assembly attach to the first net top tensioner and the second net top tensioner, respectively, top of the net on the opposite ends of the net, wherein the bow assembly attaches to approximately a mid-point of the bottom of the net.

2. The portable net system as claimed in claim 1 further comprising a centerline adjustment strap, wherein the centerline adjustment strap is attached to the top and the bottom of the net.

3. The portable net system as claimed in claim 1, wherein a tension of the bow assembly is adjustable.

4. The portable net system as claimed in claim 1 wherein the stanchions, the bow assembly, and the net top tensioners are made of a material chosen from the group consisting of carbon, glass, and organic fiber composites, wood and wood composites, epoxy, polyester, urethane, polyamide, polypropylene, and aluminum.

5. The portable net system as claimed in claim 1 wherein the stanchions have a shape chosen from the group consisting of round, oval, squared I-beam, and C-channel.

6. The portable net system as claimed in claim 1 further comprising feet assemblies attached to each of the first and second vertical stanchions.

7. The portable net system as claimed in claim 6, wherein the feet assemblies are foldable.

8. The portable net system as claimed in claim 6, wherein the feet assemblies are height adjustable.

9. The portable net system as claimed in claim 6, wherein the feet assemblies are detachable from the first and second vertical stanchions.

10. The portable net system as claimed in claim 1, wherein the first and second vertical stanchions are configured to be attached to a receptacle.

11. The portable net system as claimed in claim 1, wherein the net is adjustable for length.

12. The portable net system as claimed in claim 1 further comprising one or more feet located along the bow assembly.

13. The portable net system of claim 1 further comprising:

a draw cord attached to and lockable within at least one of the first and second net top tensioners.

* * * * *